United States Patent
Tanaka et al.

[11] Patent Number: 5,892,523
[45] Date of Patent: *Apr. 6, 1999

[54] READING UNIT AND PRINTING APPARATUS CAPABLE OF MOUNTING SUCH READING UNIT THEREON

[75] Inventors: Hiroyuki Tanaka, Kawasaki; Tsutomu Kawai, Yokohama; Shinya Asano, Tokyo; Tetsuji Kurata, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 648,885

[22] Filed: May 16, 1996

[30] Foreign Application Priority Data

May 18, 1995 [JP] Japan ................................. 7-120170
May 31, 1995 [JP] Japan ................................. 7-133810

[51] Int. Cl.$^6$ ................................................. H04N 1/024
[52] U.S. Cl. .............................. 347/3; 347/109; 347/138; 358/472; 399/110
[58] Field of Search .................................. 347/3, 19, 108, 347/109, 138, 182, 110, 170, 222, 245, 263; 358/296, 400, 401, 471, 474, 472; 399/110, 111, 113, 118, 200; 346/145

[56] References Cited

U.S. PATENT DOCUMENTS

| | | | |
|---|---|---|---|
| 4,251,153 | 2/1981 | Levine | 358/401 |
| 4,831,457 | 5/1989 | Watanabe et al. | 358/296 |
| 4,839,741 | 6/1989 | Wilson | 358/293 |
| 5,166,812 | 11/1992 | Dow et al. | 358/498 |
| 5,172,243 | 12/1992 | Hayashi et al. | 358/400 |
| 5,184,178 | 2/1993 | Takayanagi et al. | 399/16 |
| 5,381,245 | 1/1995 | Johnston et al. | 358/487 |
| 5,602,650 | 2/1997 | Tamura et al. | 358/400 |

FOREIGN PATENT DOCUMENTS

| | | |
|---|---|---|
| 59-099860 | 6/1984 | Japan . |
| 59-099861 | 6/1984 | Japan . |
| 59-099862 | 6/1984 | Japan . |
| 1-20832 | 4/1989 | Japan . |
| 2-21711 | 5/1990 | Japan . |
| 2-21712 | 5/1990 | Japan . |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

A printing apparatus includes traveling means for traveling in the recording directions by holding it for recording on a recording medium, guiding means for guiding the traveling means, and reading means detachably held by the guiding means. This printing apparatus further includes electrical connectors provided for the reading means and printing apparatus, respectively, for electrically connecting them, which are arranged to be installed or removed simultaneously by the operation of mounting the reading means on or demounting it from the guiding means, and also, detecting means for detecting a state of the reading means being mounted on the printing apparatus, controlling means for holding the power-supply to the traveling means and recovery means for recovering the performance of the recording means in a state of being cut off in accordance with the detection of the detecting means when the reading means is mounted on the printing apparatus. With such structure, it is possible to mount a reading unit in the interior of the printing apparatus easily without removing recording means, and at the same time, to prevent the reading unit from being stained by recovery means for recovering the performance of recording means.

31 Claims, 8 Drawing Sheets

READING UNIT AND PRINTING APPARATUS CAPABLE OF MOUNTING SUCH READING UNIT THEREON

BACKGROUND OF THE INVENTION

1. Field of the invention

The present invention relates to a reading unit mountable on a printing apparats, and a printing apparatus capable of mounting such reading unit thereon.

2. Related Background Art

The conventional printing apparatus is generally provided with a function to receive data from a computer and record them on a recording medium. In recent years, however, there has been a demand that the apparatus should be provided not only with such function as a printing apparatus, but also with a function to read the image data recorded on a recording medium as in a copying machine, facsimile equipment, or the like. A printing apparatus having a complex function of recording and reading is more in demand.

To comply with such demand, the printing apparatuses provided with the complex function are being developed. However, the conventional printing apparatus having reading means is such that recording means is mounted on a carriage that can hold such recording means, and that the recording means is replaced with recording means for reading images, or a method is adopted so that images are read by reading means as required, which is installed outside the printing apparatus.

For example, methods disclosed in Japanese Patent Publication No. 1-20832, Japanese Patent Publication No. 2-21711, and Japanese Patent Publication No. 2-21712, among others, are such that while sharing means for feeding a recording medium, the apparatus is arranged to make its head unit exchangeable so that it can be used for recording or reading.

Meanwhile, from the viewpoint of high-speed recording, quietness at the time of recording, smaller size and portability, an ink jet printing apparatus takes the lead among printing apparatuses available in recent years, because it can perform ink jet recording on a recording medium, such as a recording paper and a resin sheet, by use of an ink jet recording head as recording means. Also, of such ink jet printing apparatuses, the main current is the ink jet printing apparatus of a serial type wherein an ink jet recording head and ink tank are mounted on a carriage that reciprocates along a recording medium.

Now, even for such ink jet recording apparatus of the serial type, it has been desired that the apparatus should be able to perform ink jet recording, while it is provided with a function to read source documents. Here, as an actual method whereby to mount on an ink jet printing apparatus reading means provided with an image sensor or the like that optically reads images, it is possible to adopt a mode that enables reading means to be exchangeably mounted on an ink jet recording head or an ink jet recording head formed together with an ink tank, which can serve as recording means.

Nevertheless, the following problems are encountered in arranging such methods that reading means and ink jet recording means are exchangeably mounted on the apparatus:

(1) While reading means is mounted on a carriage carrier, the blade, cap, and others that serve as discharge recovery means for an ink jet recording head are in contact with the reading means. As a result, there is a fear that ink adheres to the light transmitting surface or other parts of optical path of the reading means.

(2) The mounting of reading means on the carriage requires the transmission of large power and signals between the reading means and printing apparatus. This requirement inevitably invites the provision of flexible cable having a large capacitance for connecting the carriage and printing apparatus reliably. As a result, the resultant flexibility of the cable is lowered as a whole. Also, the space on the circumference of the carriage traveling area should be made larger inevitably.

(3) Each time when recording is executed on a recording medium by use of reading means and ink jet recording means, and a source document is read by use of the reading means, extra operation and time are required to remove either one of the ink jet recording means and reading means from the carriage, and then, to mount the other one of them on the carriage.

Also, for the method whereby to install reading means outside the housing of a printing apparatus, there is a problem that the size of the printing apparatus becomes inevitably larger.

SUMMARY OF THE INVENTION

With a view to solving these problems, the present invention is designed. It is an object of the invention to provide a reading unit that can be mounted easily in the interior of a printing apparatus without removing recording means, and to provide a printing apparatus capable of mounting such reading means on it.

It is another object of the invention to provide a reading unit that can be mounted easily in the interior of a printing apparatus without removing ink jet recording means, which is arranged to be able to avoid any stains thereto due to ink discharge recovery means used, and also, to provide a printing apparatus capable of mounting such reading unit on it.

It is still another object of the invention to provide a printing apparatus including traveling means for traveling in the recording directions by holding recording means for recording on a recording medium; guiding means for guiding the traveling means; and reading means being detachably held by the guiding means.

It is a further object of the invention to provide a reading unit to read a source document, which is mountable on a printing apparatus provided with a feeding system to feed a source document or a recording medium, and a carrier having a recording cartridge detachably mounted on it, being capable of traveling along the source document or the recording medium, at the same time reciprocating in the direction different from the feeding direction of the source document or the recording medium. This reading unit includes a reader of a line reading type that can be detachably mounted on the printing apparatus to read a source document; an adapter selectively exchangeable with the recording cartridge with respect to the carrier, executing the electrical connection between the reader and the printing apparatus when this adapter is mounted on the carrier; and a cable connecting the reader and the adapter.

It is still a further object of the invention to provide a printing apparatus provided with a carrier traveling along a source document or a recording medium, at the same time reciprocating in the direction different from the feeding direction of the source document or the recording medium, and being detachably mountable on the carrier by selecting either one of the reading unit to read the source document and the recording cartridge to recording on the recording medium. This printing apparatus includes a reader of a line reading type that can be detachably mounted on the printing apparatus to read a source document; an adapter selectively exchangeable with the recording cartridge with respect to the carrier, executing the electrical connection between the reader and the printing apparatus when this adapter is mounted on the carrier; a cable connecting the reader and the adapter; and an electrical connector to perform the electrical connection with the adapter arranged for the carrier.

Other objectives and advantages besides those discussed above will be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore, reference is made to the claims which follow the description for determining the scope of the invention.

BRIEF DESCRIPTION OF THE DRAWINGS

FIG. 3A is a structural block diagram showing the state where no reading unit is mounted; and FIG. 3B, the state where the reading unit is mounted.

DETAILED DESCRIPTION OF THE PREFERRED EMBODIMENTS

Figure 1:
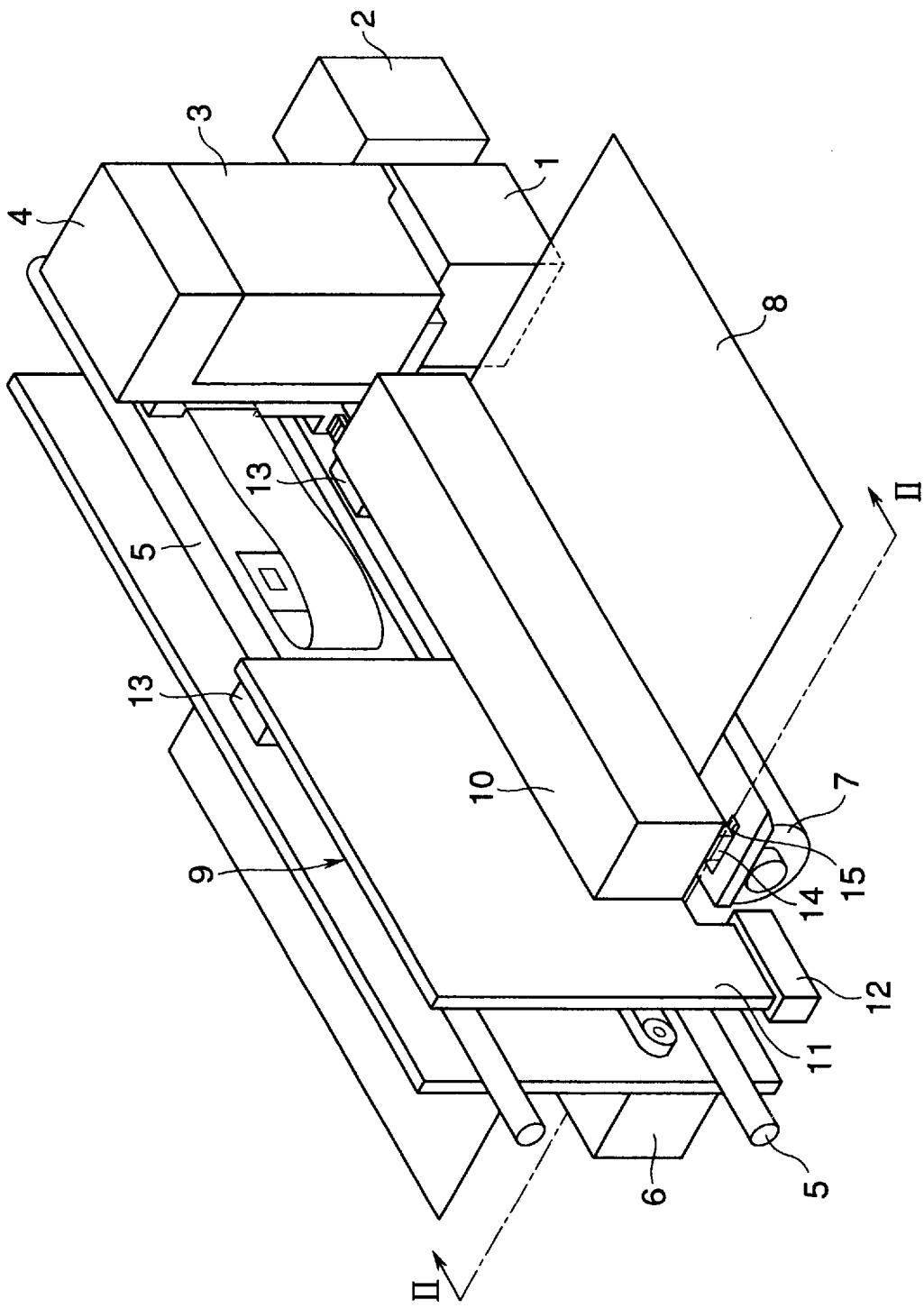
FIG. 1 is a perspective view which schematically shows the vicinity of the carriage unit of a printing apparatus having a reading unit (reading means) mounted on it in accordance with a first embodiment of the present invention.
Figure 2:
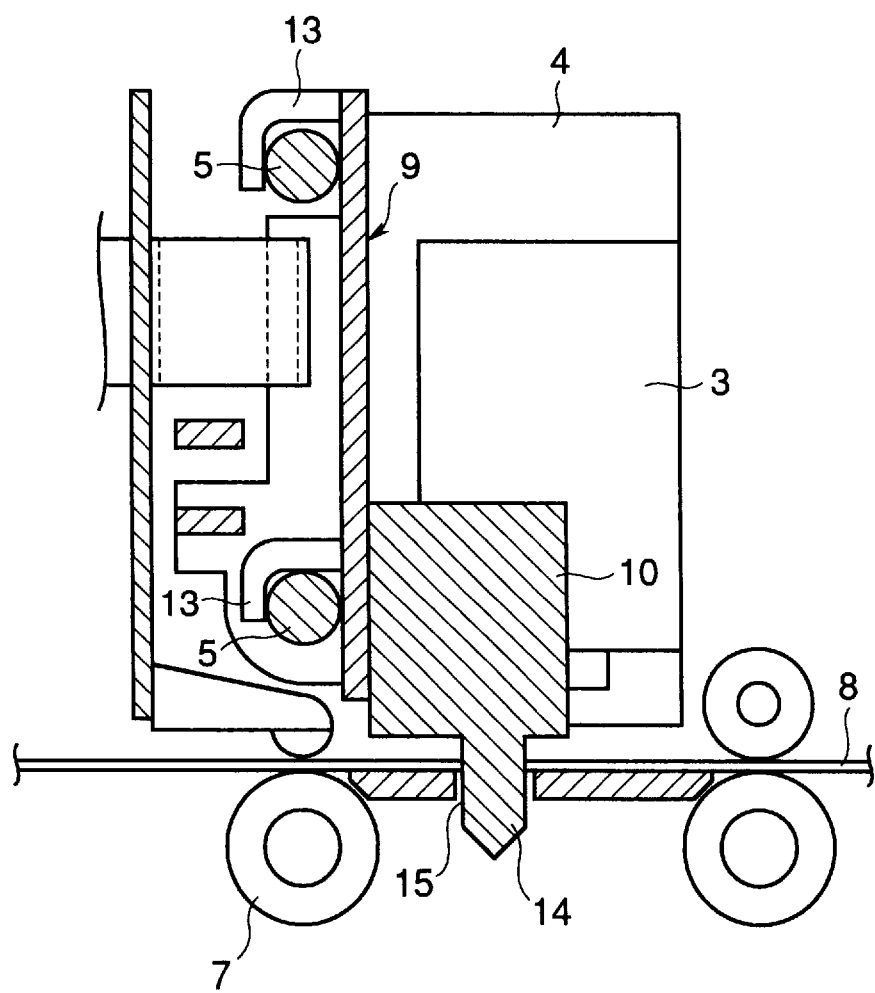
FIG. 2 is a cross-sectional view taken along line II—II in FIG. 1.

Hereinafter, with reference to the accompanying drawings, the description will be made of the embodiments in accordance with the present invention. FIG. 1 is a perspective view schematically showing the vicinity of the carriage unit of a printing apparatus having mounted on it a reading unit (reading means) in accordance with a first embodiment of the present invention. FIG. 2 is a cross-sectional view taken along line II—II in FIG. 1. In these figures, a reference numeral 1 designates a recovery unit (a blade for cleaning the discharge port formation surface and a cap to cover the discharge ports) for recovering the ink discharging performance of the recording unit; 2, a recovery (REC) motor; 3, a recording unit; 4, a carriage having the recording unit 3 mounted on it to scan on a recording medium; 5, a guide shaft supporting the carriage 4 slidably; 6, a carriage (CR) motor to cause the carriage to travel; 7, a paper feed roller; 8, a recording medium such as paper sheet or resin sheet; 9, a reading unit; 10, a reader of the reading unit 9 including a line sensor, lens and light source for reading use; 11, a connector on the unit side of the reading unit 9; 12, a connector on the main body side of a printing apparatus; 13, a supporting device for supporting the reading unit onto the guide shaft 5; 14, a positioning pin to fix the mounting position of the reading unit 9; and 15, a positioning hole provided for the printing apparatus, facing the positioning pin 14.

Here, in the present embodiment and second and third embodiments to follow, the recording unit (recording cartridge) may be in a mode where the ink jet recording head and ink tank are integrally formed or in a mode where the head and ink tank are separately formed. The ink jet recording head includes an ink jet recording head having a mode where ink is discharged from each of the ink discharge ports by the utilization of thermal energy generated by electrothermal transducing elements such as heaters or a mode where ink is discharged from each of the ink discharge ports by use of mechanically transformed energy generated by electromechanical transducing elements such as piezo materials.

When recording is performed by this printing apparatus, the carriage 4, which is the same traveling means of the conventional printing apparatus but in a state where the reading unit 9 is removed, is caused to travel on the guide shaft 5 to scan and record on a recording medium 8 to be fed intermittently. When the recording is completed, the carriage 4 is at rest facing the recovery unit 1 serving as recovery means. Then the recording unit 3 serving as recording means mounted on the carriage is capped by a rubber cap. This location represents the home position of the carriage 4. Usually, if there is no reception of any recording command, the capping is performed in order to prevent ink in the recording head in the recording unit 3 from being dried or being caused to leak. In this case, if the carriage motor 6 is suspended, the carriage 4 is in a standstill, but it is desirable to provide a fixing pin or other means for fixing the carriage 4 so as not to allow the carriage to move off from the recovery unit 1 unexpectedly.

Since the reading unit is mounted on the guide shaft after the carriage having the recording unit mounted on it is retracted to either one of the end portions of the guide shaft serving as guiding means, it is easy to mount the reading unit on or remove it from the guide shaft. Also, there is no possibility that the reading unit is in contact with the recovery device provided for the recording unit use. Therefore, the reading unit is not stained with ink or the like. Further, it is possible for the reading unit to utilize the space available in the main body of the printing apparatus effectively. Therefore, this unit does not protrude outside the printing apparatus, making it unnecessary to expand the installation space of the apparatus at all.

In the case where the detachable connectors for the power-supply and signal transmission, which can be installed or removed at the same time that the reading unit is mounted on or removed from the guide shaft, are provided for the printing apparatus main body and the reading unit, respectively, there is no need for providing cables for supplying the power and transmitting the signals. In this way, it is possible to reduce the scanning load of the carriage. This arrangement is particularly effective when the power should be supplied in a large capacitance or a large amount of data should be transferred by means of flexible cables between the reading unit and carriage.

For a printing apparatus such as an ink jet printing apparatus that should be provided with a recovery device for the recording unit, the recording unit and carriage are retracted outside the recording area of a recording medium. Therefore, it is possible to arrange a reading unit to cover the entire width of the recording area of a recording medium by utilizing the space prepared for the carriage to travel serially. As a result, reading can be effectuated over its entire range with a compact structure substantially the same as the structure and size of the conventional serial printing apparatus.

Here, with detecting means interlocked with the installation and removal of the connectors for the power-supply and signal transmission, it is possible to cut off the power supplied to the carriage traveling means and the recording unit recovery means, thus preventing them from any unexpected contact or malfunctions, and securing safety in operation in an enhanced mode.

Meanwhile, when the printing apparatus is used for the execution of reading, it is arranged to install the reading unit 9 in the traveling space of the carriage 4 while the carriage 4 is in the home position. As shown in FIG. 2, when the reading unit 9 is inserted from above, the positioning pin 14 thereof is fitted into the positioning hole 15 provided for the platen of the printing apparatus, thus enabling the reading unit to be mounted on the guiding shaft 5. Then, the reading unit 9, which is supported on the guide shaft 5 by means of the reading unit supporting device 13, enables a line sensor incorporated in the reader 10 to be arranged along a recording medium 8 in the direction different from the feeding direction of the recording medium 8. At the same time, the distance from the reading unit to the recording medium is set at a specific height.

In accordance with the present embodiment, the recording unit 3 and the carriage 4 are retracted to the location of the recovery device 1 on the right end of the guide shaft 5. There is no obstacle on the upper surface of the recording medium. Therefore, the reader 10 of the reading unit can be arranged to cover the maximum width of the recording medium 8 (a source document to be read) that can be conveyed. In a case of a printing apparatus whose structure does not allow its recording unit 3 and carriage 4 to be retracted from a recording medium 8 completely, the arrangement of the reading unit is restricted to that extent.

Also, in accordance with the present embodiment, when the reading unit 9 is mounted on the guide shaft 5, the dimension and position of each of the connectors are defined so that the connector 11 on the reading unit side serving as electrical connecting means can be connected with the connector 12 on the printing apparatus main body side depending on the intended operations. Therefore, just one operation of installation or removal of the reading unit 9 to or from the guide shaft 5 enables the simultaneous electrical connection or disconnection between the reading unit 9 and the printing apparatus. It is unnecessary to conduct any complicated operation related to the installation and removal of the unit. In this case, for the connectors 11 and 12, it is desirable to adopt the connectors that can absorb the gaps on the left and right sides of the side edges or the like so as to carry out the positioning reliably by means of the positioning pin 14.

The connectors are connecting means for transmitting the image data read by the reading unit 9 to the printing apparatus main body or for supplying the power and transmitting the control signals to the reading unit 9, and serve to connect the control circuits and signal processing circuits of the reading unit 9 and the printing apparatus main body.

As described above, in accordance with the present embodiment, the structure is arranged to allow the reading unit 9 and the connector 11 to be installed on or removed from the printing apparatus simultaneously, but there is of course no problem in arranging the system so as to conduct the installation and removal of the connector separately from the installation and removal of the reading unit.

Figure 3A:
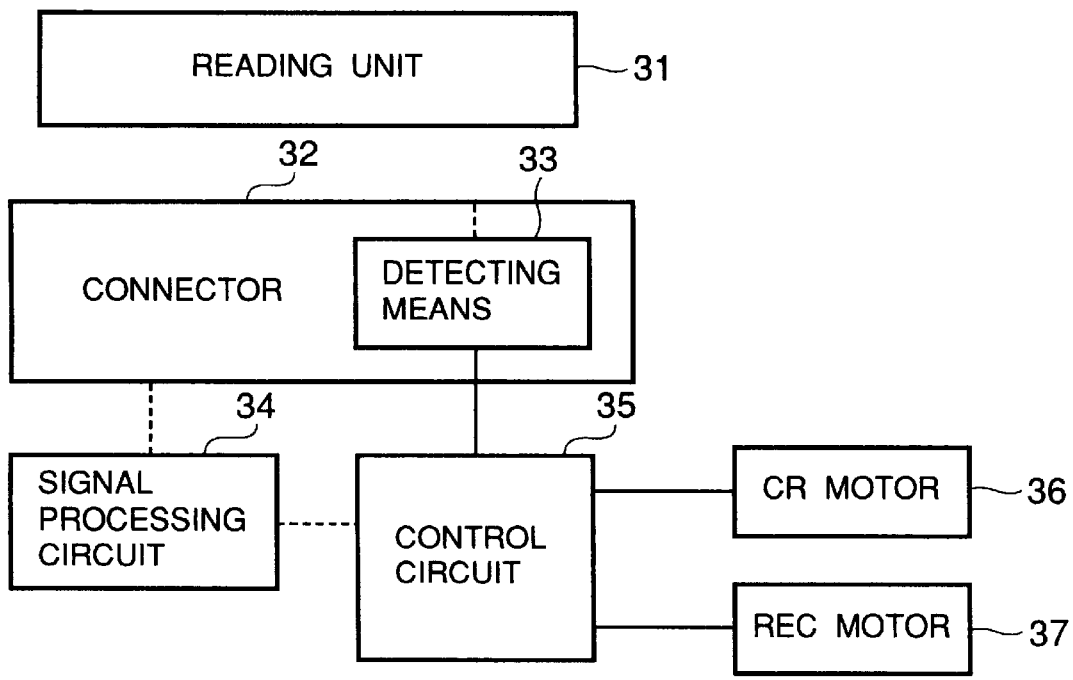
FIGS. 3A and 3B are structural block diagrams illustrating a second embodiment of the present invention.
Figure 3B:
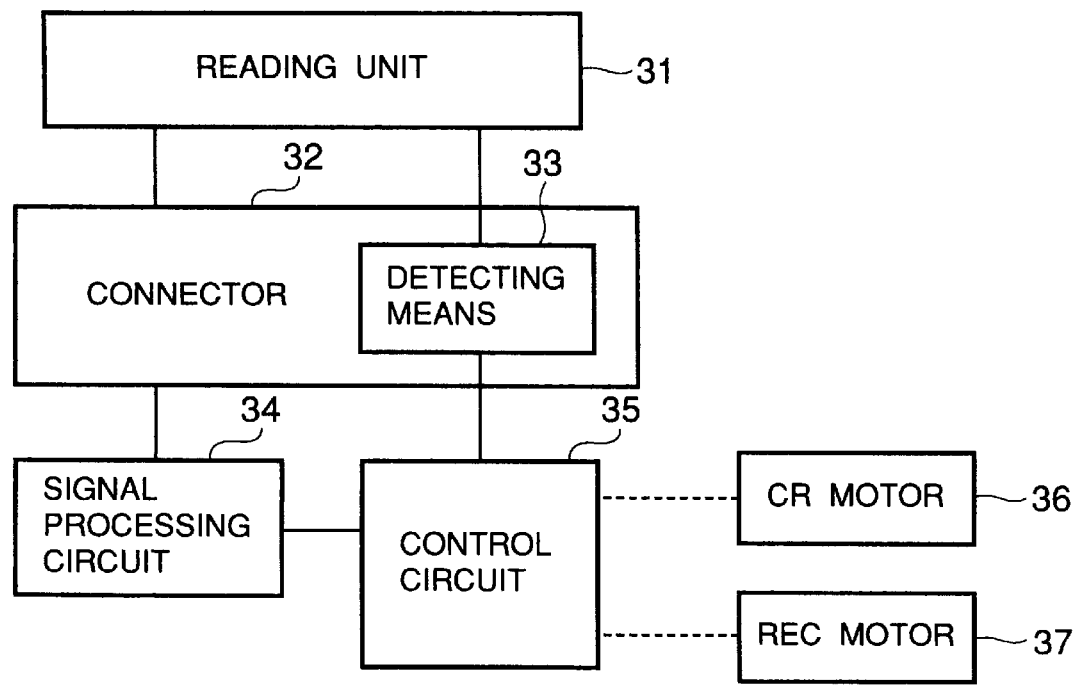

FIGS. 3A and 3B are structural block diagrams illustrating a second embodiment in accordance with the present invention: FIG. 3A is a structural block diagram showing the state where no reading unit is mounted; FIG. 3B, the state where the reading unit is mounted on a printing apparatus. In these figures, the solid lines that connect blocks indicate the circuits that are energized, while the dotted lines indicate the circuits that are disconnected.

In accordance with the second embodiment, detecting means 33 is provided for the connector 32 on the printing apparatus main body side to detect the connection and disconnection with respect to the connector on the reading unit side. When the detecting means 33 detects the connection with the connector on the reading unit side, the power-supply to the CR (carriage) motor and the REC (recovery) motor is cut off through the control circuit 35 of the printing apparatus. In this way, the carriage traveling and the operation of the recovery device are automatically suspended. Thus, it is possible to prevent the reading unit 9 from the collision that may be brought about if the carriage 4 should move while reading is executed. Also, with the provision of fixing means that can fix the carriage 4 mechanically, it is possible to fix the carriage 4 more reliably.

In accordance with the present embodiment, detecting means is provided for the connector on the printing apparatus main body to detect the connection and disconnection, but it may be possible to arrange detecting means separately. For example, a microswitch is arranged for the printing apparatus main body in order to detect the installation of the reading unit by allowing such switch to be in contact with a part of the reading unit, and then, to cut off the power supply to the carriage motor and the recovery motor. With this method, it is possible to detect the installation of units other than the reading unit that may be mounted in the same manner, and to cut off the power supply to the carriage motor and the recovery motor.

For the first and second embodiments described above, the description has been made of an ink jet printing apparatus, because the effects of the present invention is particularly conspicuous on the ink jet printing apparatus. It is needless to mention that the present invention is equally applicable to the other serial printing apparatuses.

Here, for the printing apparatus of the first and second embodiments described above, the reading unit is mounted on the printing apparatus as it is when reading is executed, while a source document is carried through the sheet feeding system when the source document is read. Thus, there is natally a limit to the size of a source document to be read. Therefore, it is impossible to read from the documents that are bound together like a book or the one that does not fit to the regular size of the system. As a result, reading from such documents makes it necessary to copy them on a sheet in the regular size before being read by use of the system. This preparation requires extra work and time inevitably.

Here, therefore, the description will be made of another embodiment in accordance with the present invention, which is free from such restrictions due to the sizes of source documents to be read.

Figure 4:
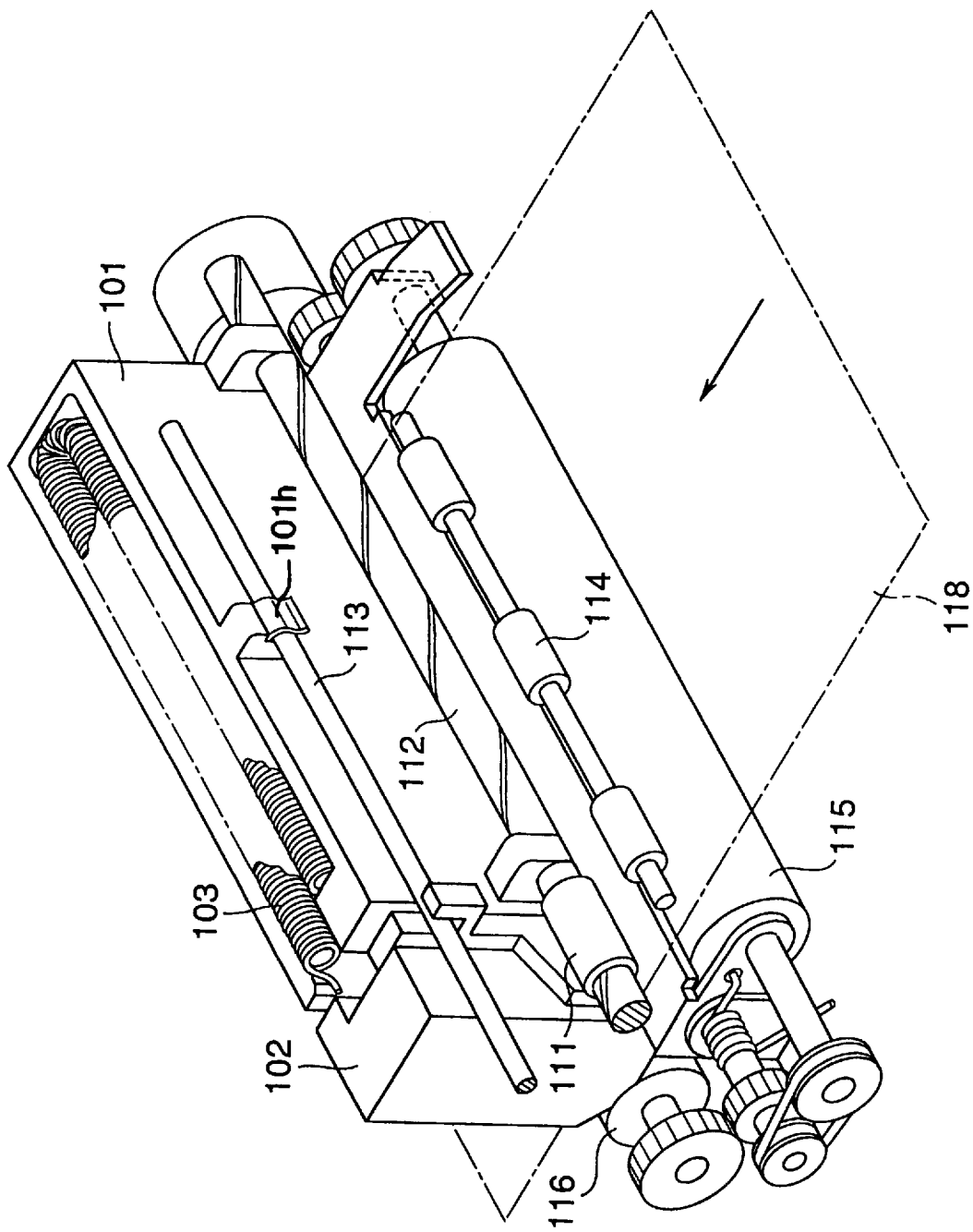
FIG. 4 is a perspective view which illustrates the operation of a printing apparatus having mounted on it a reading unit in accordance with a third embodiment of the present invention at the time of the reading unit being caused to function.
Figure 5:
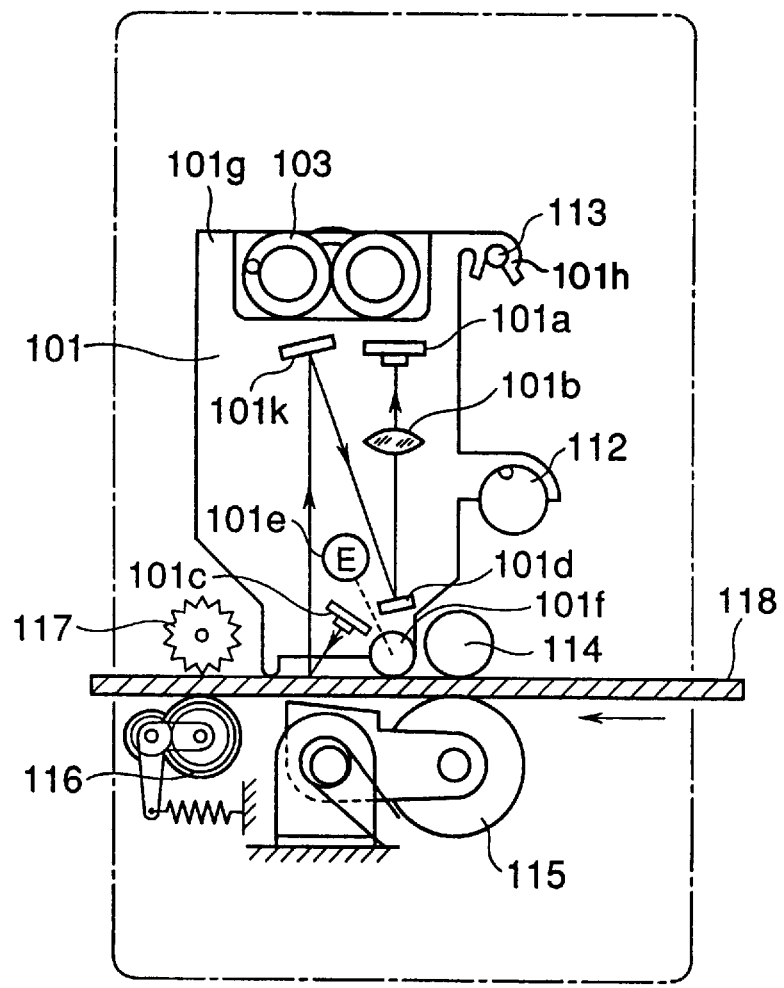
FIG. 5 is a side view which schematically shows the printing apparatus represented in FIG. 4.

FIG. 4 is a perspective view illustrating a printing apparatus having mounted on it a reading unit in accordance with a third embodiment of the present invention. Here, the reading unit is in operation. FIG. 5 is a side view schematically showing the printing apparatus represented in FIG. 4.

As shown in FIG. 4 and FIG. 5, the reading unit of the present embodiment comprises mainly a feed roller 115 to feed a source document 118; a pinch roller 114; a spur 117 and a sheet exhaust roller 116; a carrier 111; and a carrier guide 113 and a lead screw 112 serving as one means for serially moving the carrier 111 when the reading unit is in operation. The carrier guide 113 is provided with a reader 101 positioned and fixed by means of a clamp 101h in order to perform reading. On the carrier 101, an adapter 102 is mounted to electrically connect the reader 101 and the printing apparatus. The reader 101 and the adapter 102 are connected by means of a cable 103. Also, in the reader 101, there are provided an illumination LED 101c to emit reading light; a reading sensor 101a to detect the light emitted from the illumination LED 101c and reflected from the source document 118; a roller 101f to detect the fed amount of the source document 118; and an encoder 101e. Further, on the optical path through which the light reflected from the source document 118 reaches the sensor 101a, mirrors 101d and 101k, and a lens unit 101b are arranged. In this respect, a cable 103 is stored in the cable storage 101g of the reader 101. The carrier 111 is at rest in the home position with the adapter 102 being mounted on it.

With the structure described above, the operation will be carried out as described below.

When the source document 118 is fed underneath the reader 101 by means of the feed roller 118 and pinch roller 114, the reading mode begins so that the source document 118 is being read by the reader 101.

When the reading mode begins, the reading is in operation by means of the reading sensor 101a while the fed amount of the source document is being detected by the roller 101f and encoder 101e. The reading signals are transmitted to the printing apparatus through the cable 103 and adapter 102. Then, the printing apparatus functions as a sheet through reading unit of a line reading type in a mode of having a width by which to read a source document along the surface of the source document in the direction different from the feeding direction thereof.

Figure 6:
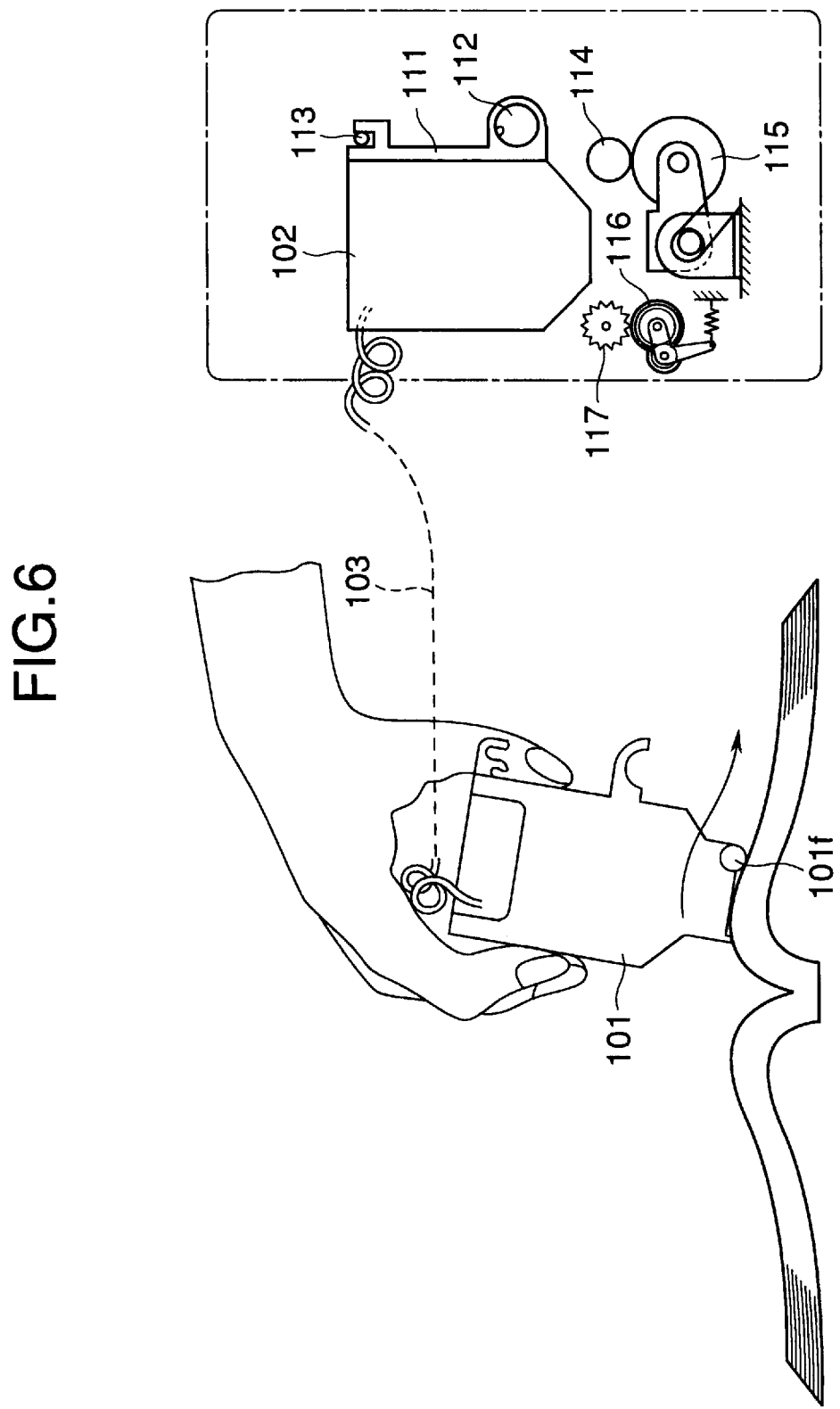
FIG. 6 is a view which shows the state where the reading unit represented in FIG. 4 is removed and used as a handy reading apparatus.

FIG. 6 is a view which shows the state where the reader 10 represented in FIG. 4 is removed and used as a handy reader.

When the reader 101 is used as a handy reader, the adapter 102 on the carrier 11 remains as it is, and the cable 103 is drawn out from the cable storage 101g. The reader 101 is removed from the carrier guide 113. Then, as shown in FIG. 6, the reader is caused to slide on the source document for reading. In this case, the reader 101 is allowed to move, while care should be taken so that the roller 101f does not slip, thus synchronizing the reading operation with the amount of movement of the reader 101.

Figure 7:
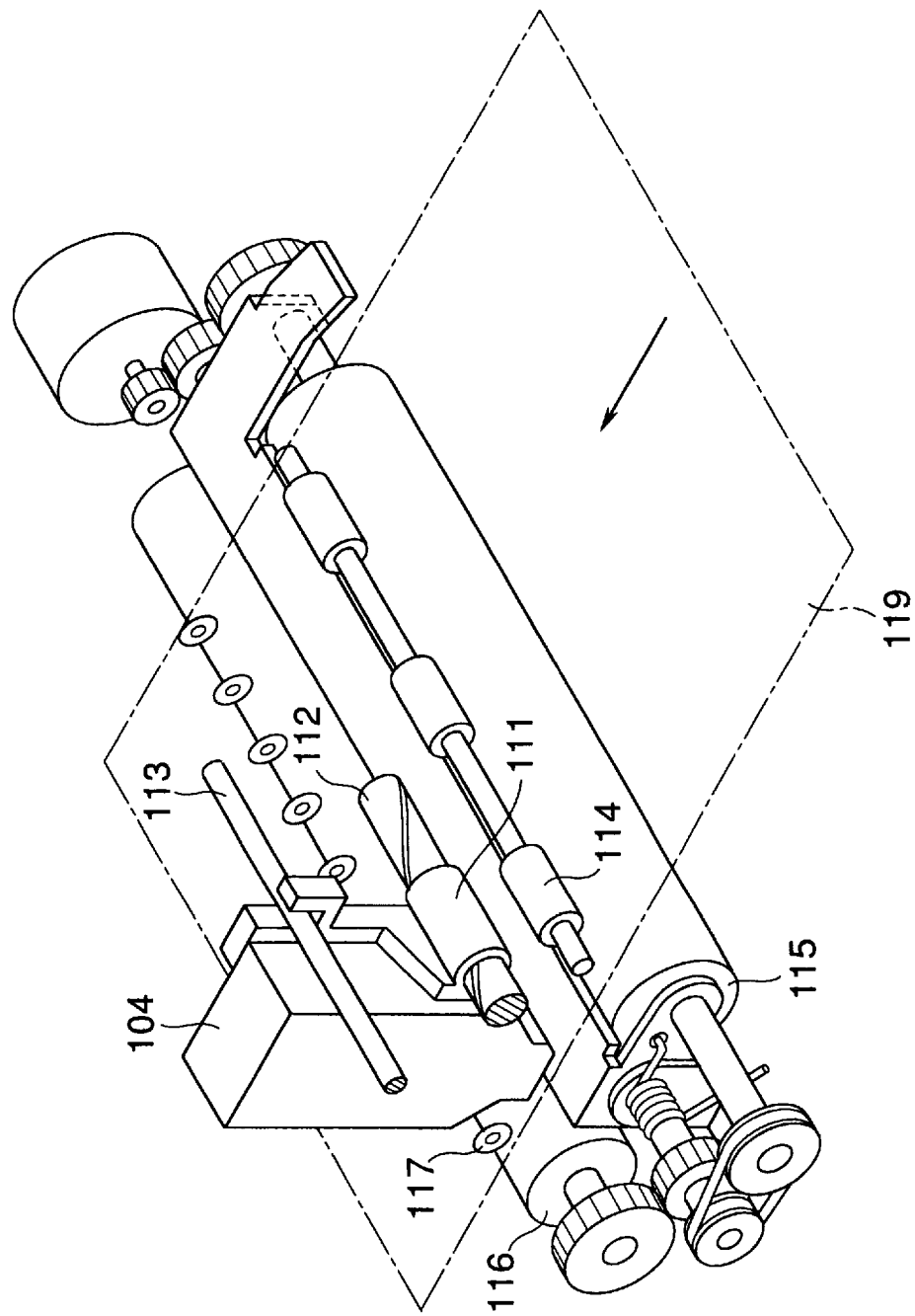
FIG. 7 is a perspective view which schematically shows the state where a recording cartridge is mounted on the printing apparatus represented in FIG. 4 in place of the reading unit.
Figure 8:
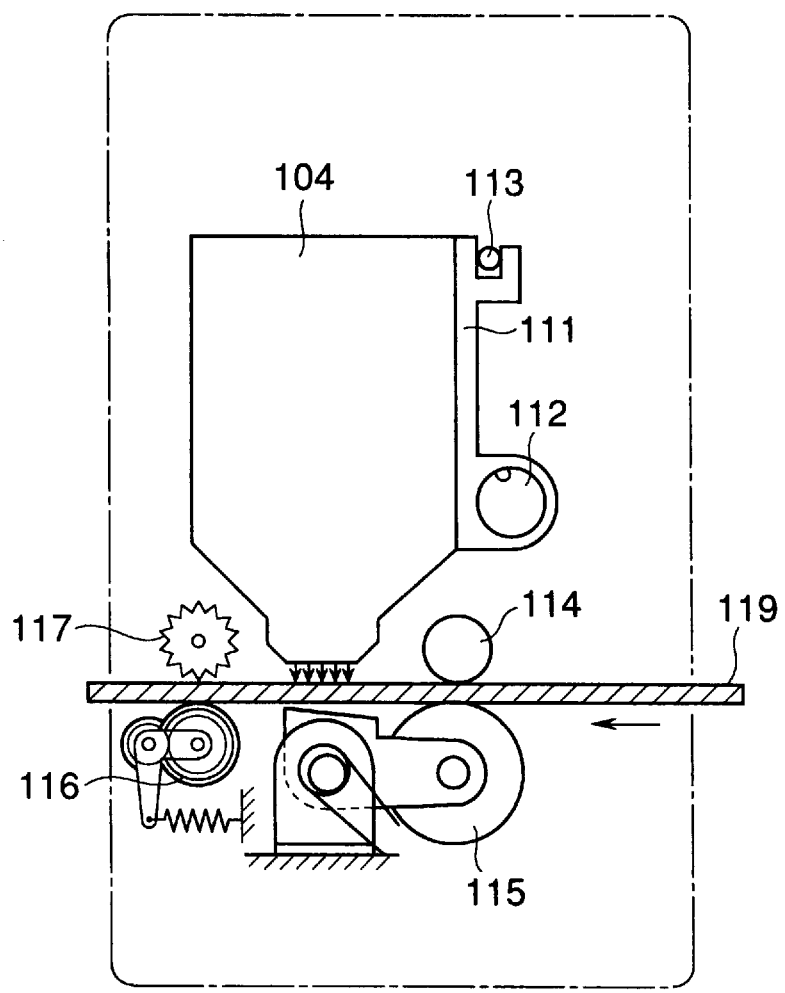
FIG. 8 is a side view which schematically shows the printing apparatus represented in FIG. 7.

FIG. 7 is a perspective view which shows the state where a recording cartridge (recording unit) is mounted on the printing apparatus represented in FIG. 4 in place of the reading unit. FIG. 8 is a side view which schematically shows the printing apparatus represented in FIG. 7.

When the present embodiment functions as a printing apparatus (executing the recording function) as shown in FIG. 7 and FIG. 8, the recording cartridge 104 is mounted on the carrier 111 in place of the reader 101 and the adapter 102 required for executing the reading function.

With the structure described above, the description will be made of the operation as given below.

When a recording sheet 119, which is a recording medium, is fed underneath the recording cartridge 104 by means of the feed roller 115 and pinch roller 114, the recording operation begins.

When the recording operation begins, the recording cartridge 104 mounted on the carrier 111 moves on the recording sheet 119 along the traveling of the carrier 111 that moves in the sub-scanning direction with respect to the feeding direction of the recording sheet 119. Thus given images are recorded on the recording sheet 119.

Also, in accordance with the present embodiment, the cable storage 101g is provided for the reader 101, but it may be possible to provide the storage for the adapter 102.

Further, the present embodiment has been described as being executed by an ink jet serial printing apparatus, but it may be possible to execute it by a printing apparatus of another type provided with a space for its carrier to travel, such as a printing apparatus of a thermal transfer type, and to enable such printing apparatus to be arranged as the one having a reading function.

With the structure described above, the present embodiment demonstrates effects as given below.

The reading unit for performing the reading operation is arranged to be removable from the printing apparatus and used for reading in accordance with the present embodiment. The source documents bound like a book or a magazine or a source document whose size does not fit to the sheet feeding system of the printing apparatus can be read as it is. In this way, it is possible to avoid degradation of character and image quality due to copying required for preparing the source document to fit the size of the sheet feeding system of the printing apparatus, thus executing a high-quality reading irrespective of the configurations and sizes of a source document. Also, the reading unit is arranged to be of a line reading type. Therefore, it becomes possible to curtail the time required for reading, and further, as compared with the serially movable reading unit type, the reading operation is conducted only by a comparatively slow relative movement between the reading unit and the source document. Therefore, it is possible to perform the reading operation quietly without creating noises.

Also, a clamp is arranged to operate the installation and removal of the reading unit to and from the printing apparatus just by one action, thus making it possible to easily operate the installation and removal of the reading unit with respect to the printing apparatus.

Moreover, the structure is arranged to store the cable in a storage when the reading unit is mounted on the printing apparatus. The cable does not stand obstructive at all.

What is claimed is:

1. A printing apparatus comprising:

traveling means for traveling in the recording direction by holding recording means for recording on a recording medium;

guiding means for guiding said traveling means;

reading means detachably held by said guiding means;

detecting means for detecting a state of said reading means being mounted on said printing apparatus;

controlling means for controlling the power-supply to cut off power to said traveling means and recovery means for recovering the performance of said recording means when said detecting means detects that said reading means is mounted on said printing apparatus.

2. A printing apparatus according to claim 1, further comprising:

electrical connectors provided for said reading means and said printing apparatus, respectively, for electrically connecting said reading means and said printing apparatus, and arranged to be one of installed and removed concurrently with an operation of mounting said reading means on and demounting said reading means from said guiding means, respectively.

3. A printing apparatus according to claim 1, wherein said detecting means is arranged for the junction of a pair of connectors each provided for said reading means and said printing apparatus for electrically connecting said reading means and said printing apparatus.

4. A printing apparatus according to claim 1, wherein said reading means is capable of performing reading when held by said guiding means and when detached from said guiding means.

5. A printing apparatus according to claim 1, wherein said recording means is provided with an ink jet head to discharge ink from the ink discharge ports for recording on a recording medium.

6. A printing apparatus according to claim 1, wherein said recording means is provided with an ink jet head to discharge ink from the ink discharge ports for recording on a recording medium by use of energy generated by electro-thermal transducing elements.

7. A reading unit to read a source document, being mountable on a printing apparatus provided with a feeding system to feed a source document or a recording medium, and a carrier having a recording cartridge detachably mounted on it, being capable of traveling along said source document or said recording medium, at the same time reciprocating in the direction different from the feeding direction of said source document or said recording medium, including the following:

a reader of a line reading type detachably mountable on said printing apparatus to read a source document;

an adapter selectively exchangeable with said recording cartridge with respect to said carrier, executing the electrical connection between said reader and said printing apparatus at the time of said adapter being mounted on said carrier; and a cable connecting said reader and said adapter.

8. A reading unit according to claim 7, wherein said reader is provided with a clamp for performing the attachment and detachment thereof to and from said printing apparatus by one-touch action.

9. A reading unit according to claim 7, wherein said reader is provided with a cable storage to store said cable.

10. A reading unit according to claim 7, wherein said adapter is provided with a cable storage to store said cable.

11. A reading unit according to claim 7, wherein said recording cartridge is provided with an ink jet head to discharge ink from the ink discharge ports for recording on a recording medium.

12. A reading unit according to claim 7, wherein said recording cartridge is provided with an ink jet head to discharge ink from the ink discharge ports for recording on a recording medium by use of energy generated by electro-thermal transducing elements.

13. A printing apparatus provided with a carrier traveling along a source document or a recording medium, at the same time reciprocating in the direction different from the feeding direction of said source document or said recording medium, and being detachably mountable on said carrier by selecting either one of the reading unit to read a source document and the recording cartridge to recording on a recording medium, including the following:

a reader of a line reading type detachably mountable on said printing apparatus to read a source document;

an adapter selectively exchangeable with said recording cartridge with respect to said carrier, executing the electrical connection between said reader and said printing apparatus when said adapter is mounted on said carrier;

a cable connecting said reader and said adapter; and an electrical connector to perform the electrical connection with said adapter arranged for said carrier.

14. A reading unit according to claim 13, wherein said reader provided with a clamp for performing the attachment and detachment thereof to and from said printing apparatus by one-touch action.

15. A reading unit according to claim 13, wherein said reader is provided with a cable storage to store said cable.

16. A reading unit according to claim 13, wherein said adapter is provided with a cable storage to store said cable.

17. A reading unit according to claim 13, wherein said electrical connector is also capable of performing the electrical connection with the recording head provided for said recording cartridge.

18. A reading unit according to claim 13, wherein said recording cartridge is provided with an ink jet head to discharge ink from the ink discharge ports for recording on a recording medium.

19. A reading unit according to claim 13, wherein said recording cartridge is provided with an ink jet head to discharge ink from the ink discharge ports for recording on a recording medium by use of energy generated by electro-thermal transducing elements.

20. A reading unit according to claim 8, wherein said reader is provided with a cable storage to store said cable.

21. A reading unit according to claim 8, wherein said adapter is provided with a cable storage to store said cable.

22. A reading unit according to claim 14, wherein said reader is provided with a cable storage to store said cable.

23. A reading unit according to claim 14, wherein said adapter is provided with a cable storage to store said cable.

24. A printing apparatus comprising:

traveling means for traveling in the recording direction by holding recording means for recording on a recording medium;

guiding means for guiding said traveling means;

reading means detachably held by said guiding means;

detecting means for detecting a state of said reading means being mounted on said printing apparatus;

controlling means for controlling to inhibit an operation of each of said traveling means and recovery means for recovering the performance of said recording means when said detecting means detects that said reading means is mounted on said printing apparatus.

25. A printing apparatus according to claim 24, wherein said controlling means for controlling the power-supply to cut off power to said travelling means and recovery means when controlling to inhibit an operation of each of said travelling means and said recovery means.

26. A printing apparatus according to claim 24, further comprising:

electrical connectors provided for said reading means and said printing apparatus, respectively, for electrically connecting said reading means and said printing apparatus, and arranged to be one of installed and removed concurrently with an operation of mounting said reading means on and demounting said reading means from said guiding means, respectively.

27. A printing apparatus according to claim 24, further comprising:

detecting means for detecting a state of said reading means being mounted on said printing apparatus;

controlling means for holding the power-supply to said travelling means and recovery means for recovering the performance of said recording means in a state of being cut off in accordance with the detection of said detecting means when said reading means is mounted on said printing apparatus.

28. A printing apparatus according to claim 24, wherein said detecting means is arranged for the junction of a pair of connectors each provided for said reading means and said printing apparatus for electrically connecting said reading means and said printing apparatus.

29. A printing apparatus according to claim 24, wherein said reading means is capable of performing reading when held by said guiding means and when detached from said guiding means.

30. A printing apparatus according to claim 24, wherein said recording means is provided with an ink jet head to discharge ink from the ink discharge ports for recording on a recording medium.

31. A printing apparatus according to claim 24, wherein said recording means is provided with an ink jet head to discharge ink from the ink discharge ports for recording on a recording medium by use of energy generated by electro-thermal transducing elements.

* * * * *

UNITED STATES PATENT AND TRADEMARK OFFICE
CERTIFICATE OF CORRECTION

PATENT NO. : 5,892,523
DATED : April 6, 1999
INVENTOR(S) : Hiroyuki Tanaka et al.

It is certified that error appears in the above-identified patent and that said Letters Patent is hereby corrected as shown below:

Column 1,
Line 7, "invention" should read -- Invention --; and
Line 9, "apparats," should read -- apparatus, --.

Column 6,
Line 49, "is" should read -- are --; and
Line 58, "natally" should read -- naturally --.

Column 10,
Line 3, "recording" should read -- record --;
Lines 15, 19, 21, 23, 27, 31, 36, 38, 40 and 42, "reading unit" should read -- printing apparatus --; and
Lines 59, and 61, "travelling" should read -- traveling --.

Column 11,
Line 11, "travelling" should read -- traveling --.

Signed and Sealed this

Fourth Day of December, 2001

Attest:

NICHOLAS P. GODICI
*Attesting Officer*    *Acting Director of the United States Patent and Trademark Office*